United States Patent [19]
Donnelly et al.

[11] Patent Number: 6,076,028
[45] Date of Patent: Jun. 13, 2000

[54] METHOD AND APPARATUS FOR AUTOMATIC VEHICLE EVENT DETECTION, CHARACTERIZATION AND REPORTING

[75] Inventors: Bruce R. Donnelly, Amherst; David G. Schabel, Depew, both of N.Y.

[73] Assignee: Veridian Engineering, Inc., Alexandria, Va.

[21] Appl. No.: 09/161,740

[22] Filed: Sep. 29, 1998

[51] Int. Cl.[7] .................................................. B60R 21/00
[52] U.S. Cl. .................................................. 701/45; 701/46
[58] Field of Search .............................. 701/45, 46, 213, 701/300; 340/989, 436, 990; 280/735; 307/10.1; 342/357.09

[56] References Cited

U.S. PATENT DOCUMENTS

| | | | |
|---|---|---|---|
| 3,646,583 | 2/1972 | Scuderi | 340/52 H |
| 4,369,426 | 1/1983 | Merkel | 340/32 |
| 5,311,197 | 5/1994 | Sorden et al. | 342/457 |
| 5,338,206 | 8/1994 | Hupfer | 434/305 |
| 5,436,838 | 7/1995 | Miyamori | 364/424.05 |
| 5,484,166 | 1/1996 | Mazur et al. | 280/735 |
| 5,498,028 | 3/1996 | Carlin et al. | 280/735 |
| 5,506,775 | 4/1996 | Tsurushima et al. | 364/424.05 |
| 5,508,920 | 4/1996 | Gioutsos et al. | 364/424.05 |
| 5,541,842 | 7/1996 | Gioutsos et al. | 364/424.05 |
| 5,546,307 | 8/1996 | Mazur et al. | 364/424.05 |
| 5,555,174 | 9/1996 | Okimoto et al. | 364/424.05 |
| 5,574,427 | 11/1996 | Cavallaro | 340/436 |
| 5,587,906 | 12/1996 | McIver et al. | 364/424.045 |
| 5,620,202 | 4/1997 | Gray et al. | 280/735 |
| 5,635,624 | 6/1997 | Cerny | 73/12.01 |
| 5,899,948 | 5/1999 | Raphael et al. | 701/45 |

FOREIGN PATENT DOCUMENTS 0 709 257 A1   5/1996   European Pat. Off. .

*Primary Examiner*—Michael J. Zanelli
*Attorney, Agent, or Firm*—Steptoe & Johnson LLP

[57] ABSTRACT

A method and apparatus for automatic vehicle event detection, characterization and reporting. A processor processes accelerometer data from a vehicle over varying length windows of time to detect and characterize vehicle events such as crashes. The processed data is compared to thresholds to detect and characterize events. Such events are then reported to a dispatch center using wireless communications and providing vehicle location information. The dispatch center contacts the public safety answering point(s) necessary to provide services to the vehicle.

21 Claims, 9 Drawing Sheets

PRINCIPLE DIRECTION OF FORCE (O'CLOCK) DELTA V THRESHOLD AT 5% OF INJURIES MISSED

METHOD AND APPARATUS FOR AUTOMATIC VEHICLE EVENT DETECTION, CHARACTERIZATION AND REPORTING

BACKGROUND OF THE INVENTION

The present invention relates generally to vehicle event detection and notification systems, and in particular to a method and apparatus for automatically detecting, characterizing, and reporting vehicle events, such as crashes.

Airbag systems detect crash events in a very short period of time and then deploy one or more airbags. For example, U.S. Pat. No. 5,546,307, to Mazur, discloses an apparatus for controlling actuation of an occupant restraint system in a vehicle. U.S. Pat. No. 5,436,838, to Miyamori, discloses an apparatus for operating an inflatable occupant restraint system. The following patents are also directed to airbag deployment: U.S. Pat. No. 5,587,906, to McIver; U.S. Pat. No. 5,555,174, to Okimoto; U.S. Pat. No. 5,506,775, to Tsurushima et al.; U.S. Pat. No. 5,5508,920, to Gioutsos; U.S. Pat. No. 5,541,842, to Gioutsos; and U.S. Pat. No. 5,484,166, to Mazur. U.S. Pat. No. 5,574,427, to Cavallaro, is directed to a system that detects when an airbag deploys and then sends an emergency message.

U.S. Pat. No. 5,311,197, to Sorden et al., discloses event-activated reporting of vehicle location. U.S. Patent No. 5,223,844, to Mansell et al., discloses a vehicle tracking and security system which automatically transmits the vehicle's location when an alarm activates or upon the request of the vehicle operator. U.S. Pat. No. 3,646,583, to Scuderi, and U.S. Pat. No. 4,369,426, to Merkel, disclose moving mass sensors and message transmission when an airbag deployment is detected.

The following patents are also directed to vehicle-related notification systems: U.S. Pat. No. 5,504,482, to Schreder; U.S. Pat. No. 5,515,043, to Berard et al.; U.S. Pat. No. 5,555,286, to Tendler; and U.S. Pat. No. 5,574,427, to Cavallaro.

SUMMARY OF THE INVENTION

An object of the present invention is to provide a method and apparatus for detecting, characterizing and reporting vehicle events such as crashes. In one embodiment of the invention, an apparatus includes a tri-axial accelerometer, a signal processor and a data storage device. The tri-axial accelerometer measures acceleration data along three independent axes and sends the data to the processor. The processor stores the data in the data storage and processes the data to detect and characterize crash events. The processor calculates average resultant acceleration values over varying length windows of time and compares those values to a start acceleration threshold. If any average resultant acceleration values exceed the start threshold, the processor calculates delta velocity ($\Delta V$) values for the average resultant acceleration values that exceed the start threshold and compares the $\Delta V$ values to a velocity threshold. The processor detects the start of a crash event when a $\Delta V$ exceeds the velocity threshold. The apparatus detects the end of the crash event when the magnitude of the average resultant acceleration remains below an acceleration end threshold for a predetermined number of acceleration values. The apparatus will resume processing acceleration data using the start acceleration and delta velocity thresholds to determine if additional crash events occur.

Another object of the present invention is to characterize vehicle events such as crashes and to automatically notify appropriate emergency personnel. This object is accomplished by an automatic crash notification system, which may include an in-vehicle module and dispatch center. The in-vehicle module will detect crashes, determine the vehicle location and automatically communicate the occurrence of a crash and related crash data to a dispatch center. The dispatch center will receive communications from an in-vehicle module and automatically notify the proper public safety access point. Additionally the dispatch center will display crash data and location on a map on a display for a dispatch center operator.

The present invention is well suited for use in an automatic crash notification system where an in-vehicle module detects a vehicle crash and then automatically notifies a dispatch center of the crash and sends to the dispatch center data such as crash location data, crash data and vehicle data. The dispatch center then notifies public safety answering points, i.e., fire, police, ambulance, etc., of the crash, the crash location and other pertinent data.

DETAILED DESCRIPTION OF THE PREFERRED EMBODIMENT

In the case of crashes, it is believed that a reduction in response time by emergency services to vehicle crashes can help save the lives of many crash victims. A crash victim's time to the hospital comprises the following time segments: (1) crash to emergency services dispatch; (2) emergency services dispatch to arrival at crash scene; (3) emergency services arrival at crash scene to departure from crash scene; and (4) emergency services departure from crash scene to arrival at hospital.

A crash victim typically must rely on his own ability or the ability of others to notify an emergency services dispatcher for assistance. In the case of serious injury, the crash victim may be completely dependent on others to report the crash. Such a dependence on others can lengthen the time and reliability of the dispatch of emergency services to a crash site, especially in less congested areas. The use of an automatic crash notification system can reduce this time.

When a crash occurs, the exact location of the crash is not always accurately reported to the emergency services dispatcher. As a result, the dispatcher does not always dispatch emergency services from the nearest public safety answering point (PSAP), e.g., fire, police or ambulance, to the crash site. The use of an automatic crash notification system can also reduce this time.

Additionally, an automatic crash notification system can often provide more detailed and reliable information than would otherwise be available as to what public safety answering point services are necessary. For example, if a crash is not severe, then the need for certain services, such as ambulances, might not be required. Accordingly, an automatic crash notification system promotes better allocation of such scarce resources for the situations where they are most beneficial.

Emergency services are often deployed to a crash scene when the nature of the crash is not known. Time might also be lost while emergency services personnel evaluate the scene of the accident. An automatic crash notification system can provide public safety answering points with additional information relating to a crash, i.e., severity of crash, occupant information, type of vehicle, etc., that will allow the emergency services personnel to act more quickly and efficiently upon arrival at the crash scene, thus reducing the time before a victim arrives at the hospital.

Figure 1A:
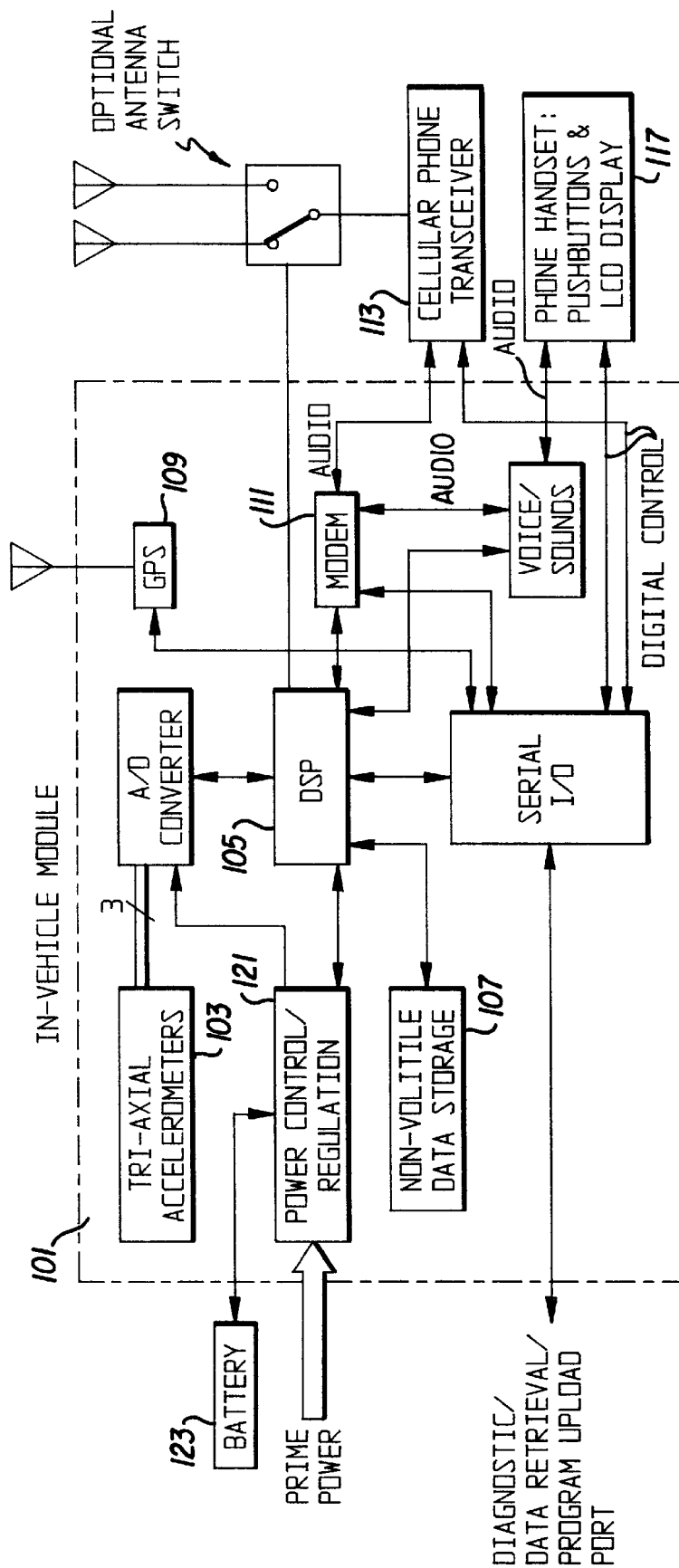
FIGS. 1A and 1B are block diagrams of an automatic crash notification system according to a preferred embodiment of the present invention.
Figure 1B:
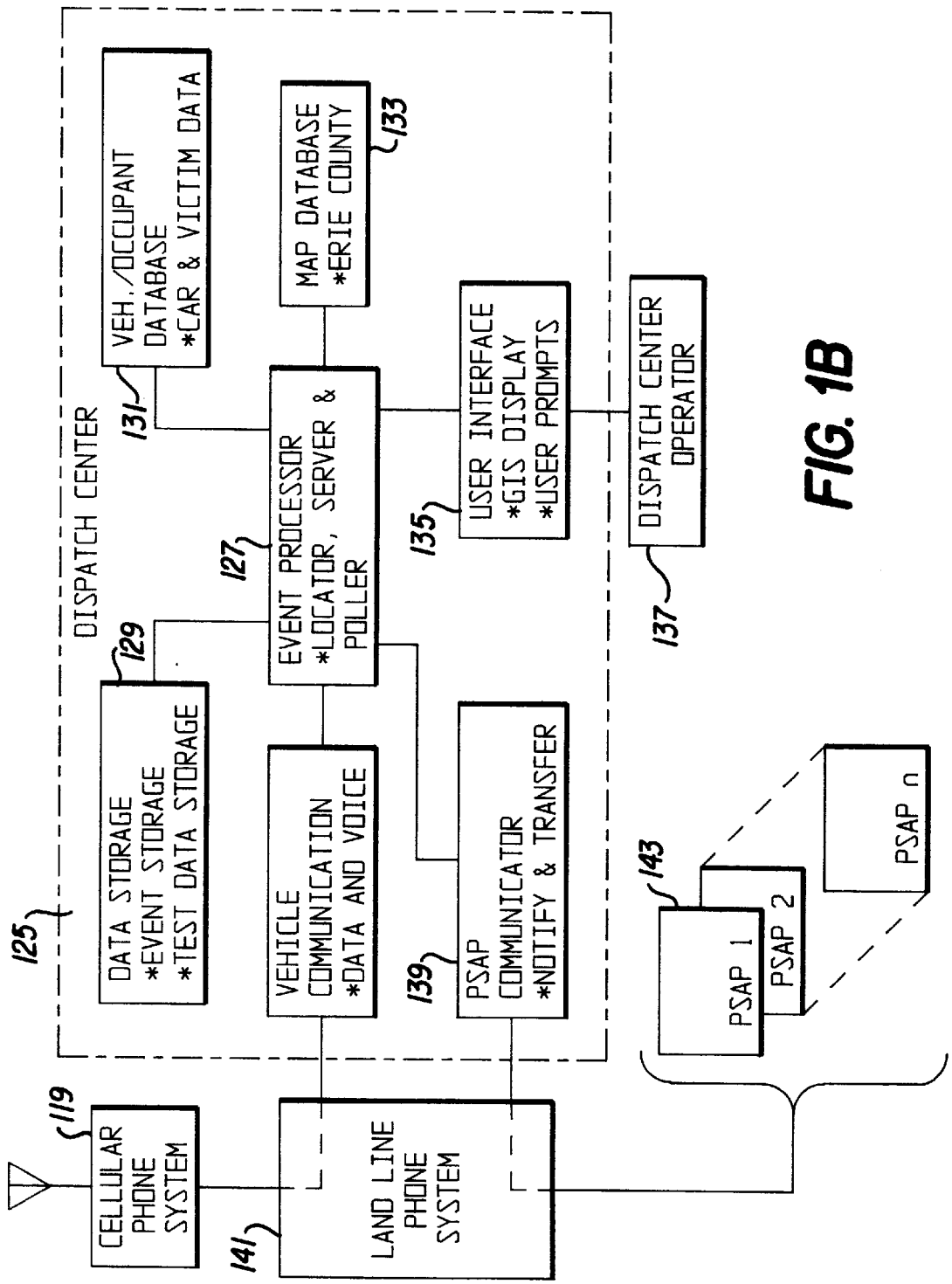

FIGS. 1A and 1B are block diagrams showing a preferred embodiment of an automatic crash notification apparatus according to the present invention. An in-vehicle module 101 resides in or on a vehicle and performs crash detection, crash characterization, location estimation and crash notification functions. The crash detection and characterization functions utilize a tri-axial accelerometer 103, a data processor 105 and nonvolatile data storage 107.

The tri-axial accelerometer 103 includes three accelerometers that each measure linear acceleration along a separate axis, preferably along three linearly-independent axes. In a preferred embodiment, these three axes are orthogonal to each other (for computational ease), but the axes need not be orthogonal. Any type accelerometers can be used, including any of various known and commercially-available accelerometers. The tri-axial accelerometer 103 sends acceleration data to the processor 105. The processor 105 implements a crash detection method and also controls the operation of the in-vehicle module 101 as explained in more detail below. Nonvolatile data storage 107 stores crash event data received from the processor 105 even if power is lost, which allows for post-crash data retrieval and analysis. If power is restored, the stored crash data can still be transmitted.

A preferred embodiment of the invention implements a location estimation function using a Global Positioning System (GPS) receiver 109, which determines the crash location to within 100 m (meter) one-sigma accuracy or better. The GPS receiver processes signals from a number of GPS satellites using time difference of arrival to calculate the receiver's position. Other types of positioning systems can be used to provide position so long as the positional accuracy is adequate for public safety answering point personnel to locate the vehicle.

The in-vehicle module 101 provides crash notification to a dispatch center 125 (FIG. 1B) when the in-vehicle module detects a crash event. The processor 105 activates the modem 111 when it detects a crash event and sends crash event data to a modem 111. The modem 111 modulates the crash event data for transmission via a cellular phone transceiver 113 to a cellular phone system 119 (FIG. 1B). The modem also passes to the cellular phone transceiver 113 voice and tones from a phone handset 117. Although the preferred embodiment uses cellular phone technology, other data transmission methods may be used, including wireless data transmission methods.

A power-control/regulation module 121 provides, controls and regulates the power supplied to the in-vehicle module 101 from the vehicle. A battery 123 attached to the power-control/regulation module 121 provides back-up power in the event the vehicle power is lost, which is possible in a severe crash. It is preferable to locate the battery 123 near the in-vehicle module 101 to minimize the chance that a crash will disconnect the battery 123 from the in-vehicle module 101.

FIG. 1B is a block diagram of a dispatch center 125. When the in-vehicle module 101 (FIG. 1A) detects a crash, it places a cellular phone call to the dispatch center 125. An event processor 127 in the dispatch center 125 receives either voice or crash event data from the in-vehicle module 101 through the cellular phone system 119. The event processor 127 stores the crash event data in data storage 129. The crash event data can be in one or more of a number of formats depending upon the vehicle's specific in-vehicle module, and the dispatch center 125 is designed with flexibility to handle a variety of crash event data formats. Preferably, the crash event data contains a vehicle identification, and the event processor 127 accesses a vehicle/occupant database 131 to augment crash data with additional information. The vehicle/occupant database 131 can include vehicle/occupant information, such as vehicle make, model and type and expected occupant name, phone number, address, age, health conditions and physician. The event processor 127 displays the vehicle occupant information, when available, to a dispatch center operator 137 via user interface 135 to assist the operator 137 in assessing the crash severity and any special needs of the occupant.

The event processor 127 connects to a map database 133 and can display a map overlaid with locations of the crash and local public safety answering points (PSAP) 143. Upon notification of a crash and after receipt of the crash event data, the event processor 127 will attempt to open a voice link with the occupant of the vehicle to obtain more information regarding the accident and the severity of any injuries. Based upon all of the information received, the dispatch center 125: (1) selects one or more appropriate PSAPs 143; (2) sends pertinent data to the selected PSAPs 143; and (3) dispatches response resources to the crash event location. The processor 127 can automatically initiate communication with the PSAPs 143, or the dispatch center operator 137 can manually initiate communication. The type of communication with the PSAP 143 depends on the PSAP's capability. For example, the dispatch center can communicate to a PSAP 143, via digital data, facsimile or telephone link. The dispatch center 125 is flexible enough in its design to handle the data format and transmission types that the public safety answering points 143 are able to accommodate.

Figure 2:
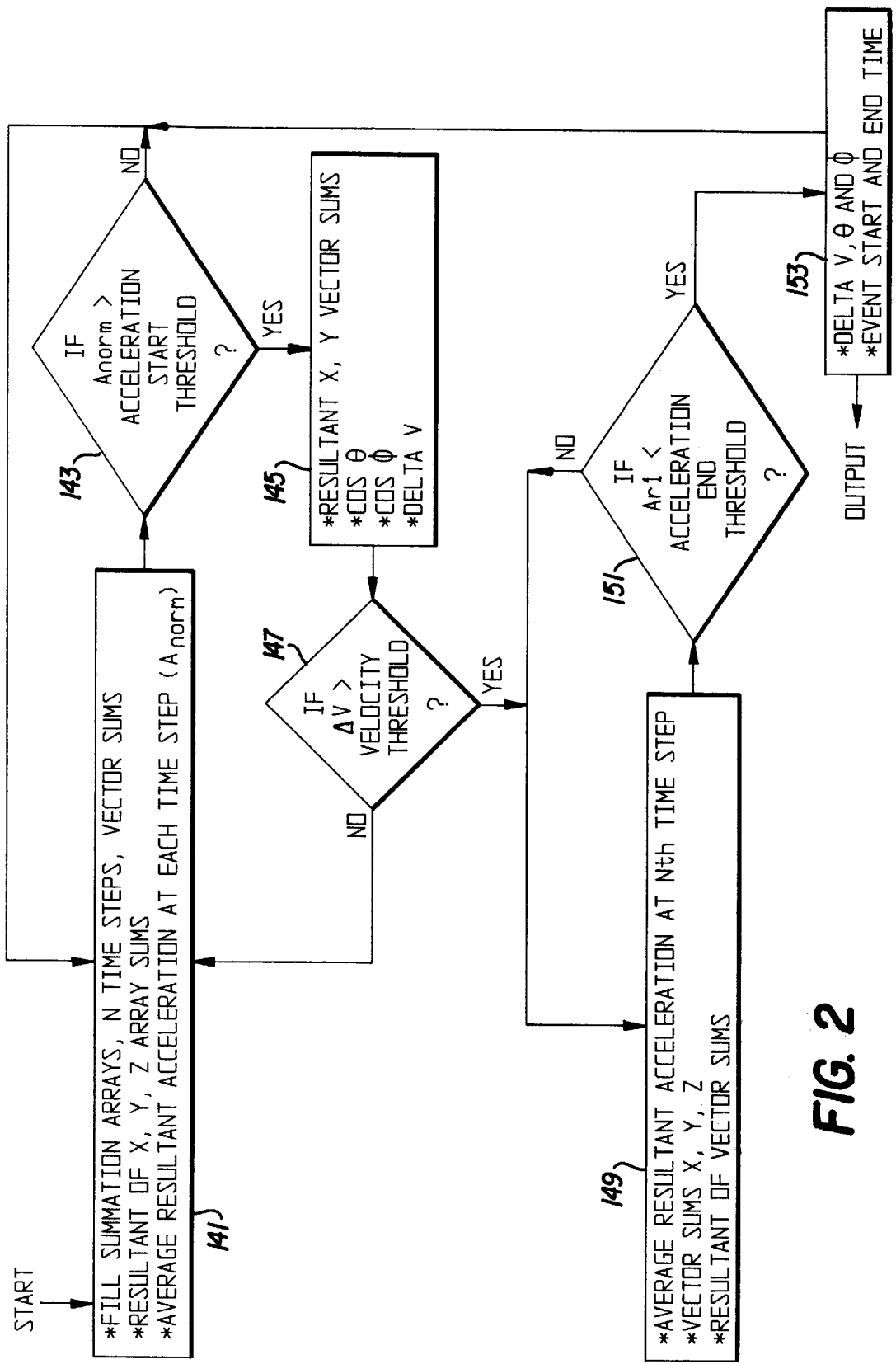
FIG. 2 is a flow chart for a crash recognition method according to a preferred embodiment of the present invention.

FIG. 2 is a flow chart of a preferred embodiment of an in vehicle crash detection method. The crash detection method operates with the following steps:

(1) Collect acceleration data and calculate an array of average resultant accelerations $A_{norm}$ 141.

(2) Determine whether $A_{norm}$ exceeds an acceleration start threshold value 143. If not, collect more acceleration data 141. If so, continue to step (3).

(3) Calculate ΔV (delta V) and a velocity threshold 145.

(4) Determine whether ΔV exceeds a velocity threshold 147. If not, collect more data 141. If so, continue to step (5).

(5) Calculate average resultant acceleration and acceleration vectorsums over the crash duration 149.

(6) Determine whether average resultant acceleration values are an acceleration end threshold 151. If not, collect more data and continue to calculate acceleration vectorsums 149. If so, calculate and report final crash event data 153 and return to normal collection of acceleration data 141.

The crash detection method is described in greater detail below.

For illustration, the method will be described for acceleration data measured along orthogonal x, y and z axes. The positive x-axis runs in the horizontal plane through the front of the vehicle. The positive y-axis runs in the horizontal plane through the side of the vehicle to the drivers right. The positive z-axis runs vertically downward. If desired, the invention may be implemented placing the axes in other directions. In the discussion below, bolded variables such as $A_x$ or $A_{norm}$ indicate arrays of data. Subscripts of "x", "y" or "z" indicate data relating to the x, y or z axis respectively. Subscripts of "i" or "n" indicate a specific indexed value in an array. (For example, $A_{xi}$ refers to a series of data A relating to the x-axis, where each value in the series has a unique value associated with each value of an index i.)

Figure 3A:
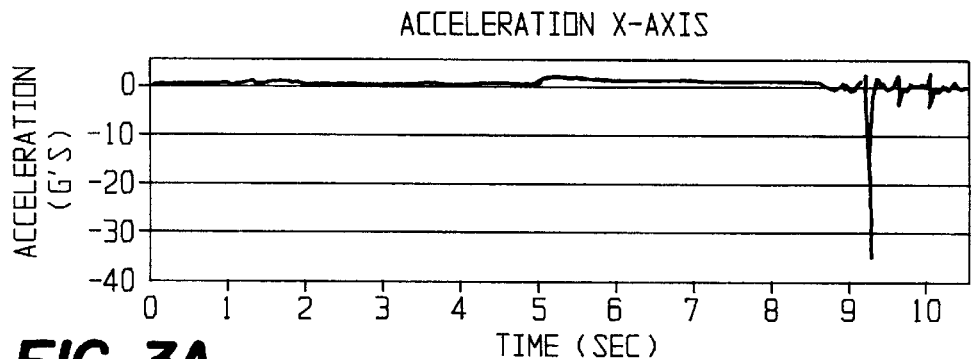
FIGS. 3A, 3B and 3C are plots of an example of vehicle acceleration data.
Figure 3B:
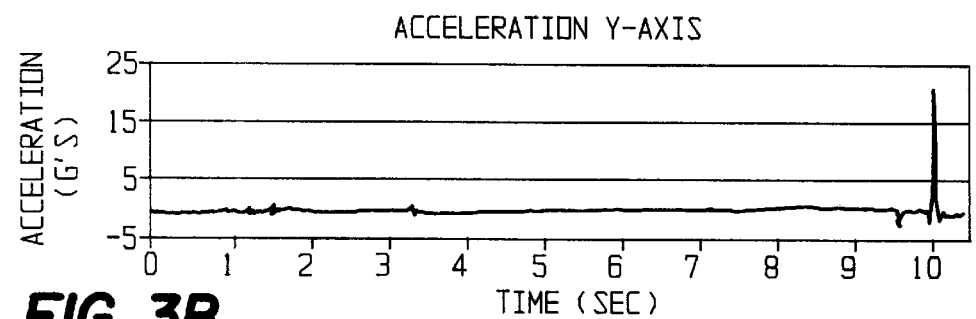
Figure 3C:
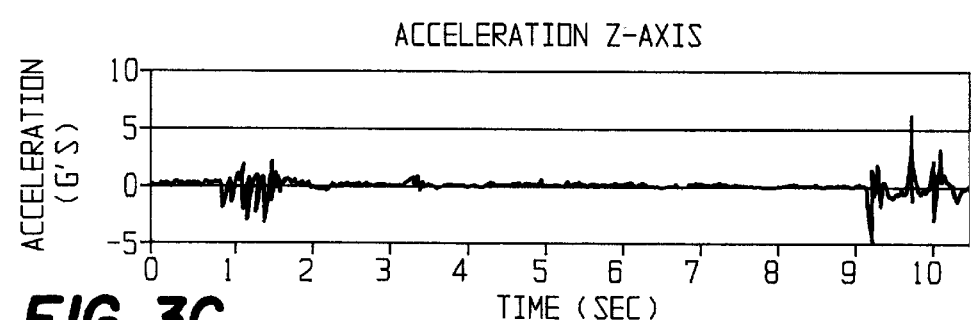

FIGS. 3A, 3B and 3C are plots of an example of acceleration data along the x, y and z axes respectively over a time interval of approximately 10 seconds. In a preferred embodiment, acceleration data is collected along each axis of the tri-axial accelerometer 103 at a 180 Hz rate, but other collection data rates can be implemented. The acceleration data in FIGS. 3A, 3B and 3C, which is an example of the type of event data that may be processed, will be used throughout this description to show the operation of the preferred embodiment.

Figure 4A:
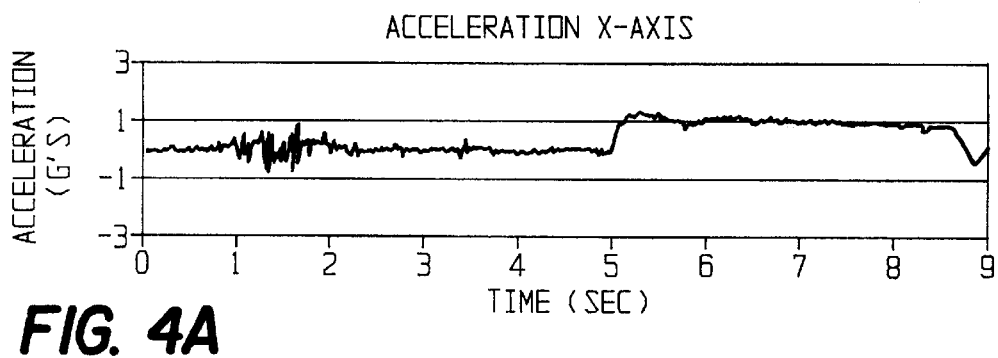
FIGS. 4A, 4B and 4C are plots of an example of vehicle acceleration data illustrating rough driving.
Figure 4B:
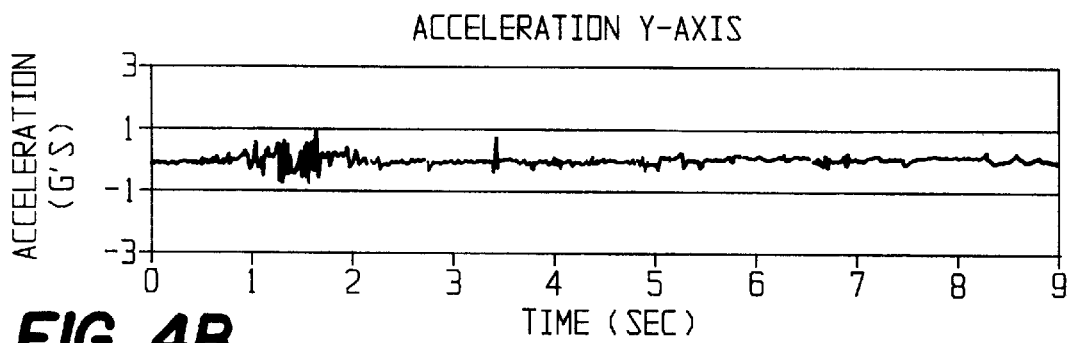
Figure 4C:
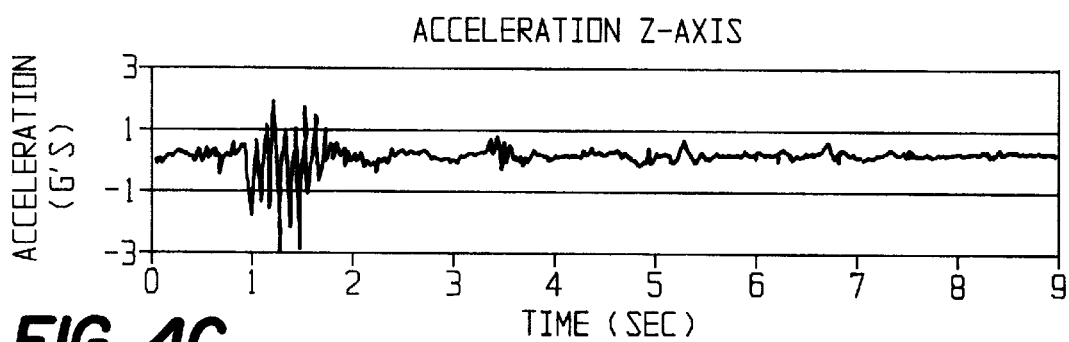
Figure 5A:
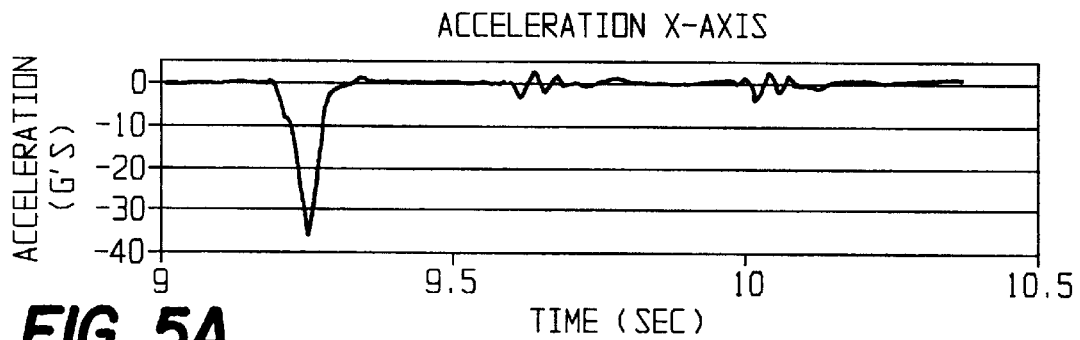
FIGS. 5A, 5B and 5C are plots of an example of vehicle acceleration data illustrating three crash events.
Figure 5B:
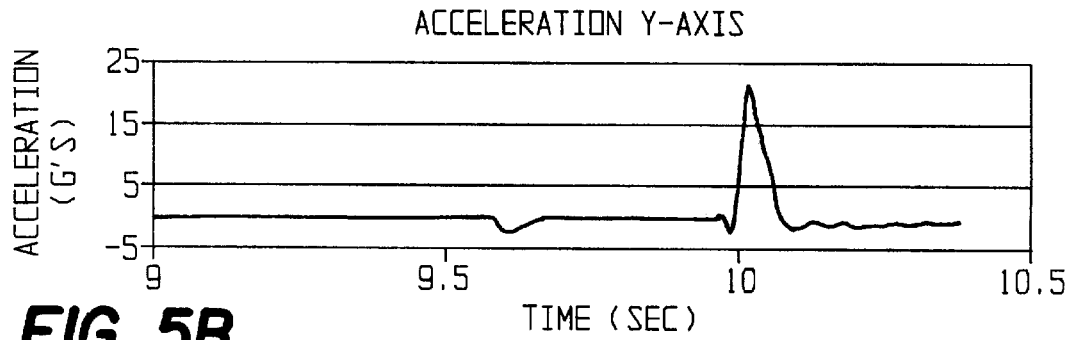
Figure 5C:
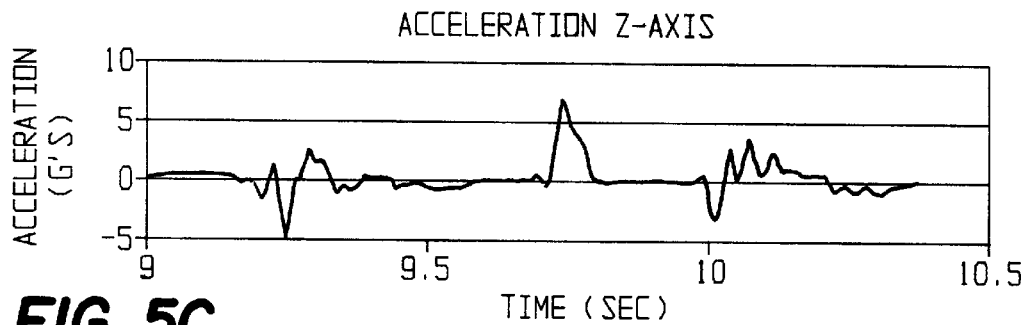

FIGS. 4A, 4B and 4C illustrate an example of rough driving conditions during approximately the first 9 seconds of the acceleration data, but no crash is indicated. FIGS. 5A, 5B and 5C illustrate three different crash events during the last few seconds of the acceleration data. These three events can be seen in the plots as occurring at approximately 9.3 seconds, 9.7 seconds and 10.1 seconds respectively.

In the preferred embodiment, at each of a series of points in time, the processor 105 (FIG. 1A) calculates an array consisting of 18 elements by operating on 18 contiguous acceleration data measurements for each accelerometer. This array consists of elements representing the sums of acceleration data over varying lengths, or windows, of time. The following equations illustrate how the arrays $A_x$, $A_y$ and $A_z$ are calculated at a time corresponding to i from individual acceleration measurements $a_{xn}$ $a_{yn}$ and $a_{zn}$:

$$A_x = \left( \sum_{n=i-17}^{i} a_{x_n}, \sum_{n=i-16}^{i} a_{x_n}, \ldots, a_{x_{i-1}} + a_{x_i}, a_{x_i} \right)$$

$$A_y = \left( \sum_{n=i-17}^{i} a_{y_n}, \sum_{n=i-16}^{i} a_{y_n}, \ldots, a_{y_{i-1}} + a_{y_i}, a_{y_i} \right)$$

$$A_z = \left( \sum_{n=i-17}^{i} a_{z_n}, \sum_{n=i-16}^{i} a_{z_n}, \ldots, a_{z_{i-1}} + a_{z_i}, a_{z_i} \right)$$

Figure 6:
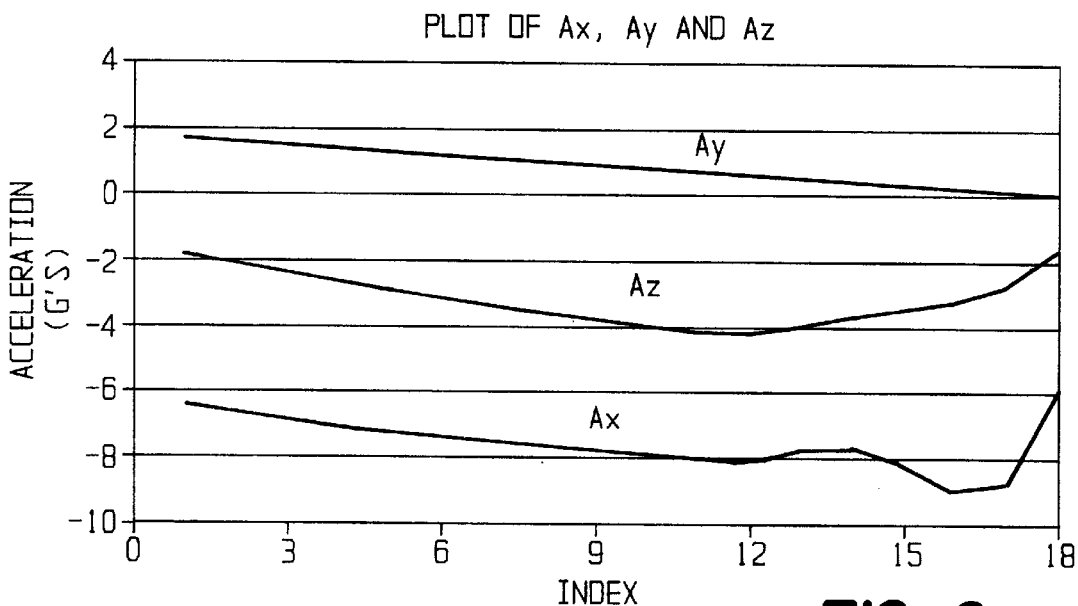
FIG. 6 is a plot of three arrays $A_x$, $A_y$ and $A_z$ corresponding to the vehicle acceleration data in FIGS. 3A, 3B and 3C.

The first element $A_{xn}$ of $A_x$ is the summation of the 18 acceleration values within the window. The second element is the summation of the last 17 acceleration values within the window. This series continues so that the second-to-last element $A_{xi-1}$ of $A_x$ is the summation of the last 2 acceleration values in the window, and the last element $A_{xi}$ is the last (most current) acceleration measurement $a_{xi}$. FIG. 6 is a plot of $A_x$, $A_y$ and $A_z$ at the time of 9.2 seconds calculated from the acceleration data shown in FIGS. 5A, 5B and 5C.

The processor 105 (FIG. 1A) calculates $A_r$, which is the magnitude of the accumulated acceleration vector at each point in arrays $A_x$, $A_y$ and $A_z$, as defined in the following equation:

$$A_r = \left( \sqrt{A_{x1}^2 + A_{y1}^2 + A_{z1}^2}, \ldots, \sqrt{A_{x18}^2 + A_{y18}^2 + A_{z18}^2} \right)$$

Figure 7:
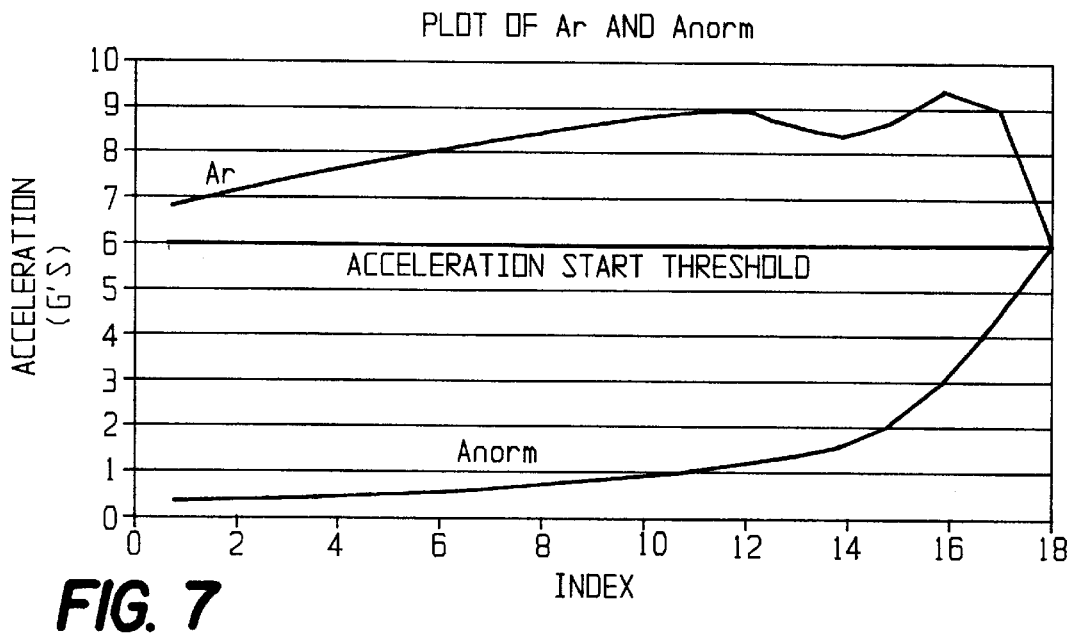
FIG. 7 is a plot of $A_r$ and $A_{norm}$ corresponding to the $A_x$, $A_y$ and $A_z$ data in FIG. 6.

FIG. 7 includes a plot of $A_r$ corresponding to the plots of $A_x$, $A_y$ and $A_x$ shown in FIG. 6. The processor 105 next calculates an $A_{norm}$ array from $A_r$ as shown in the following equation:

$$A_{norm} = \left( \frac{A_{r1}}{18}, \frac{A_{r2}}{17}, \ldots, \frac{A_{r18}}{1} \right)$$

Each point of the $A_{norm}$ array represents the average resultant acceleration over a window or length of time ranging from 1 time sample to 18 time samples. Thus, $A_{norm}$ is an array of average resultant acceleration calculated over varying windows or lengths of time. FIG. 7 also includes a plot of $A_{norm}$ corresponding to the plot of $A_r$. The processor 105 compares each value of the $A_{norm}$ array to an acceleration start threshold, which in the preferred embodiment is set to 5 G's (a G force is a standard unit of acceleration of 9.8 m/sec$^2$) and shown in FIG. 7. The value of this threshold may be adjusted to minimize the detection of non-crash events such as rough driving while still detecting the desired proportion of crashes.

Figure 8:
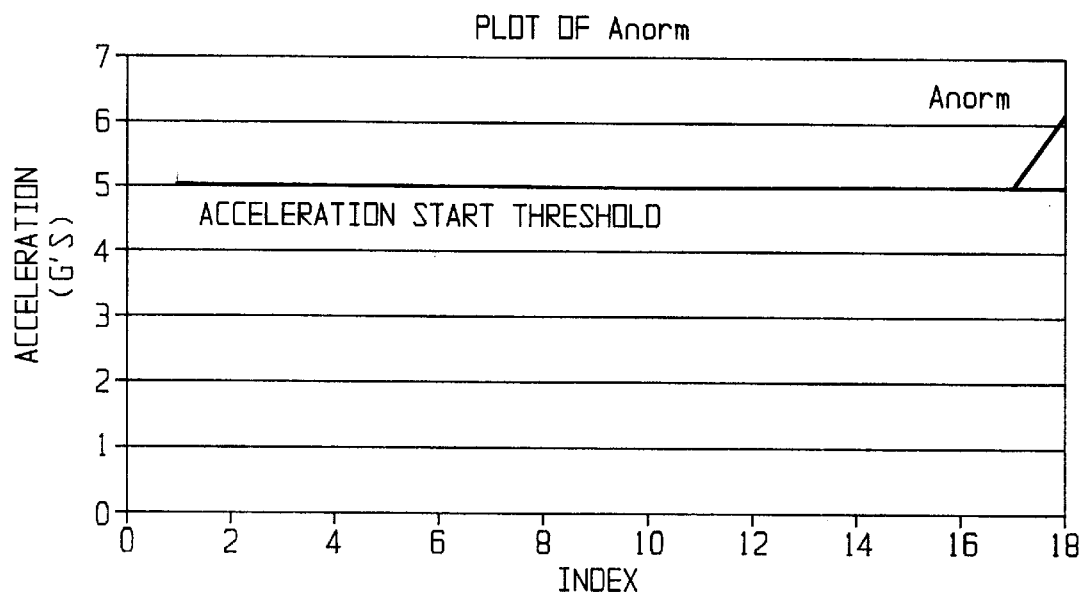
FIG. 8 is a plot of the elements of $A_{norm}$ corresponding to the $A_{norm}$ data shown in FIG. 7 that exceed the acceleration start threshold.

FIG. 8 is a plot showing those values of $A_{norm}$ that exceed the acceleration start threshold. In FIG. 8, only the last element of $A_{norm}$ exceeds the acceleration start threshold. The processor 105 determines the index of each value of $A_{norm}$ that exceeds the acceleration threshold and places the index in a new array called $A_{det}$.

Figure 9:
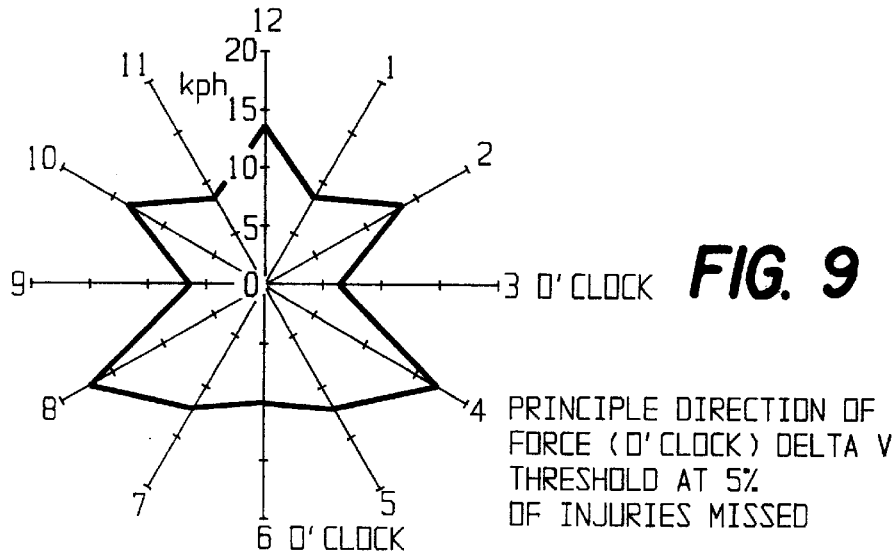
FIG. 9 is a plot of a delta velocity threshold used in a preferred embodiment of the invention versus a principal direction of force.

Next, the processor 105 calculates a velocity threshold that is a function of the direction of the principal direction of force. FIG. 9 illustrates how the velocity threshold varies as a function of angle in the x–y plane of the vehicle. In the preferred embodiment, the crash velocity threshold is selected to detect, on average, 95% of all injury-causing crashes, i.e., only 5% of injury-causing accidents will occur on average for ΔV's less than the crash velocity threshold. Other thresholds may be selected. By virtue of the threshold feature of the invention, a balance can be struck where the desired percentage of injury-causing crashes are detected without excessive false detections (where no injury is likely to occur).

In the preferred embodiment, twelve velocity threshold values are set, one for each 30° sector using a convention based upon the numbers on a clock, i.e., 1 o'clock through 12 o'clock. The processor 105 calculates the direction of the principal direction of force in the vehicle's horizontal x–y plane and then selects the corresponding velocity threshold. The following equation illustrates a calculation for determining the direction of the principal direction of force in the vehicle's horizontal x–y plane:

$$\theta = \cos^{-1}\left(\frac{A_{yI}}{\sqrt{A_{xI}^2 + A_{yI}^2}}\right)$$

The following equation illustrates a calculation for determining the principal direction of force relative to the vehicle's vertical axis:

$$\phi = \cos^{-1}\left(\frac{A_{yI}}{\sqrt{A_{yI}^2 + A_{zI}^2}}\right)$$

If the principal direction of force is within 30° of the vehicle's vertical axis (i.e., greater than 60° from horizontal) and the value of az >0, then a rollover velocity threshold value is used. For the preferred embodiment, the rollover velocity threshold is set to 5 kph. In the present example θ=179°, φ=3.7° and $a_z$=−1.5 kph. The roll condition is not met, therefore the threshold is selected based upon the threshold plot shown in FIG. 9. The proper horizontal threshold is 13.5 kph because θ=179° corresponds to 12 o'clock.

Because high indices indicate more recent events and low indices indicate events further back in time, $A_{det}$ is processed from the first element to the last element searching for the start of a crash event. Next the processor 105 (FIG. 1A) calculates ΔV for each index in $A_{det}$ and compares each ΔV to the velocity threshold. The processor calculates ΔV by multiplying the element of $A_r$ indicated by $A_{det}$ by Δt (i.e., the time between data samples).

Figure 10:
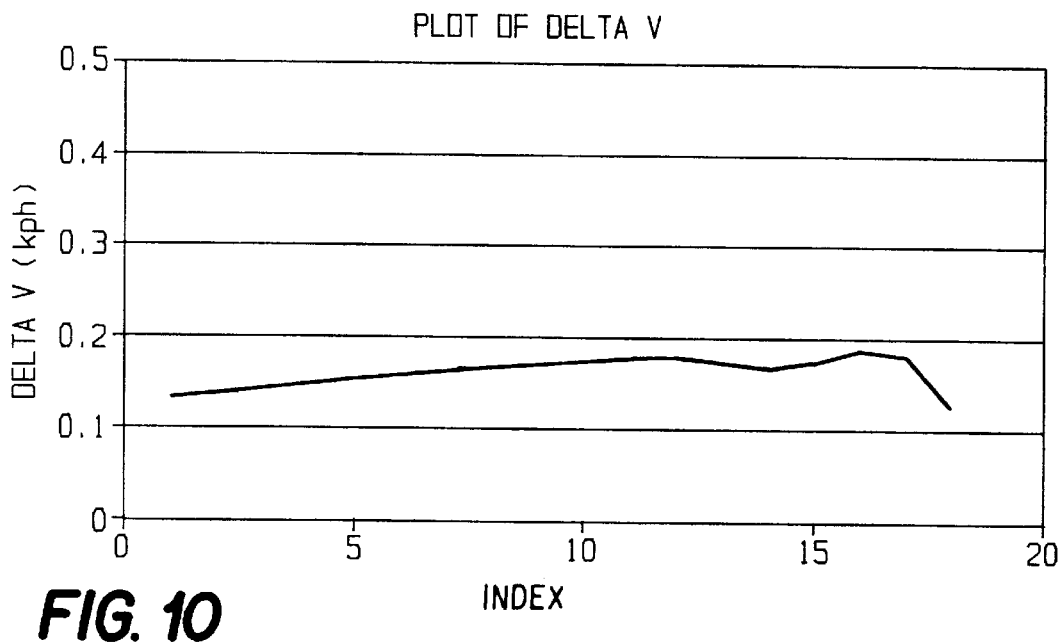
FIG. 10 is a plot of $\Delta V$ corresponding to the $A_r$ data in FIG. 7.

FIG. 10 is a plot of the value of ΔV for each index. If ΔV exceeds the velocity threshold, then the beginning of a crash has been detected. In the example data, there is only a single time to evaluate, and ΔV has not exceeded a threshold value, therefore a crash event has not yet been detected. If $A_{det}$ has more than one element, i.e., more than one value of $A_{norm}$ that exceeds the acceleration start threshold, then the processor 105 (FIG. 1A) performs the ΔV calculation and threshold comparison for every element until either: (1) a crash event is detected, or (2) all of the elements have been processed.

If a crash is detected, the next step is to search for the end of the crash event 149 and 151 (FIG. 2). If no crash is detected, the subsequent acceleration data points are processed as shown at 141 (FIG. 2), and the process continues as described above.

Figure 11:
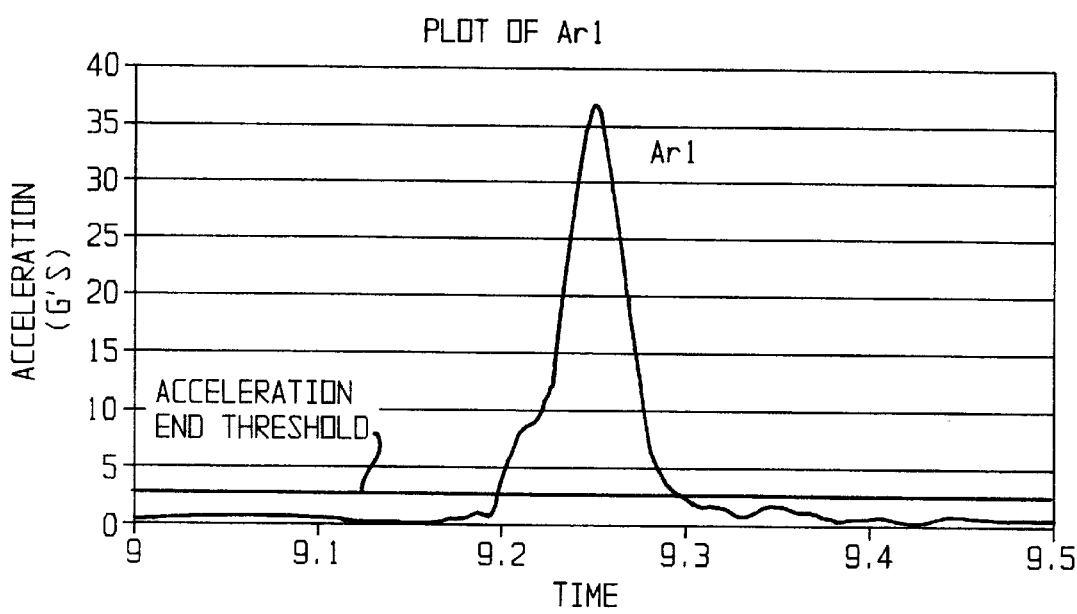
FIG. 11 is plot of $A_{r1}$ corresponding to the acceleration data in FIGS. 3A, 3B and 3C.

To determine when the crash event ends, the processor 105 calculates an 18-point array $A_{r1}$ that is the magnitude of the average resultant acceleration at each point. When all 18 values of $A_{r1}$ return to a value below an acceleration end threshold, the crash event has ended. If not, then the 18-point window slides one data point, and processor 105 repeats the same calculations until all the values of $A_{r1}$ return to a value below the acceleration end threshold. The acceleration end threshold is set to 3 G's for this embodiment. This value is set to distinguish between different crash events. The acceleration end threshold may be the same as the first threshold to simplify the system. FIG. 11 is a plot of $A_{r1}$ for the crash event shown in FIGS. 4–8 with a horizontal line indicating the 3-G threshold. The value of $A_{r1}$ does not drop below this 3-G acceleration end threshold for 18 consecutive data points (i.e., until the range of 9.3–9.4 seconds).

When the processor 105 (FIG. 1A) has identified the end of the event, the processor 105 stores data relating to the crash event 153 (FIG. 2). Even when a single crash event has been identified, further crash events may occur, e.g., in a multi-vehicle crash; therefore, the processing will continue for an additional time to determine if additional crash events occur. In a preferred embodiment this additional time is 8 seconds. When the additional time has passed after the end of a crash event and the processor 105 has not detected another crash event, the in-vehicle module 101 (FIG. 1A) will notify the dispatch center 125 (FIG. 1B) of the crash event.

After the final crash event is detected, the processor 105 calculates a final roll angle value to determine the vehicle's final rest position (e.g., upright, upside-down, right side or left side). When the vehicle comes to rest, the force of gravity will exert a constant 1 G final acceleration towards the Earth on the accelerometer 103. The tri-axial accelerometer is biased 1 G along the z-axis so that under normal driving operation the tri-axial accelerometer reads (0, 0, 0). Therefore, if the vehicle is right side up, the final acceleration vector will be (0, 0, 0). If the vehicle is upside down, the final acceleration vector will be (0, 0, 2) because of the 1 G force due to gravity and a 1 G bias. If the vehicle is on its right side, the final acceleration vector will be (0, −1, 1). If the vehicle is on its left side, the final acceleration vector will be (0, 1, 1). The processor 105 determines the orientation of this gravitational force using the y and z components of the final acceleration vector compensated to account for the fixed bias to calculate the roll angle of the final rest position. At this time, the processor 105 gathers data for each crash event and the final rest position of the vehicle and reports this information to the dispatch center 125.

The following table lists preferred types of data sent from the in-vehicle module 101 to the dispatch center 125 according to a preferred embodiment. Other data, including any calculated arrays or values, may be sent.

| Data Transferred | Comments |
|---|---|
| Vehicle Identification | Allows the dispatch center 125 to access vehicle specific data from vehicle database. |
| Date and Time of Crash Event | Defines the time span of the crash event. |
| Latitude and Longitude of the Vehicle | Uses GPS location data. |
| True Course and Ground Speed of Vehicle | Uses GPS data. |
| Principal Direction of Force | The principal direction of the crash force experienced by the vehicle in clock direction. |
| Delta velocity (ΔV) | The change in velocity experienced during the crash event. |
| Rollover | Indicates whether the vehicle rolled over. |
| Final x, y and z acceleration values | The final acceleration x, y and z values due to the force of gravity for the final rest position. |
| Length of Acceleration Data | Specifies the time length of the acceleration data history that follows. |
| Acceleration Data History for the x, y and z axes ($a_x$, $a_y$, $a_z$) | Acceleration data recorded during the crash event. |

The various thresholds, window sizes and locations, array sizes and data sampling rates all can be varied depending on the equipment available or specific requirements for applying this invention. Additionally, in another embodiment of this invention, it is contemplated to only use two accelerometers, ie., one along the x-axis and one along the y-axis in which case calculations involving z-axis data are omitted.

Figure 12:
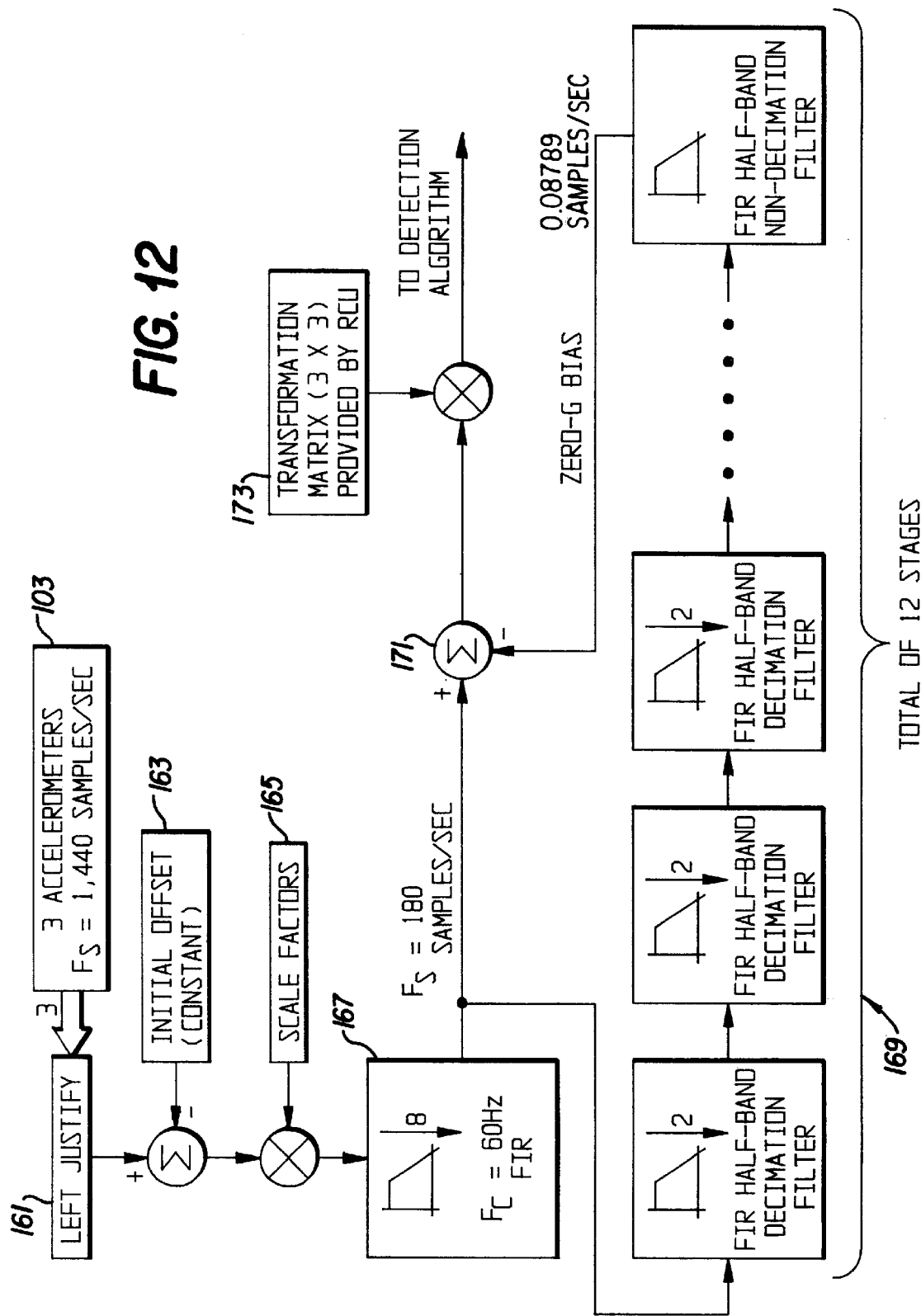
FIG. 12 is a block diagram illustrating an acceleration data filter.

FIG. 12 is a block diagram illustrating an acceleration data filter. The in-vehicle module 102 (FIG. 1A) compensates for DC bias in the accelerometer data. The tri-axial accelerometer 103 produces 1,440 acceleration measurements per second for each axis. The filter left-justifies the data samples 161 and subtracts an initial offset 163. The filter scales the data samples using device-dependent scale factors 165, passes the data samples through a 60 Hz low-pass finite-impulse-response (FIR) filter 167, and decimates (downsamples) this signal by 8 to produce a 180 samples-per-second signal. A twelve-stage FIR low-pass filter bank 169 filters the output of the 60 Hz low-pass FIR filter 167 to produce the zero-g bias value. An adder 171 subtracts the zero-g bias value from the output of the 60 Hz low-pass FIR filter 167 to produce unbiased accelerometer data. The unbiased accelerometer data is multiplied by a transformation matrix 173 to convert the accelerometer data from the accelerometer coordinate system to the vehicle coordinate system. The filtered acceleration data then passes to the crash detection apparatus.

After learning of the embodiments described above, people practicing in this art will be able to make variations that fall within the spirit and scope of the invention. The embodiments described above are exemplary but not intended to limit unduly the scope of the invention as defined by the following claims.

What is claimed:

1. A method for detecting a vehicle crash event comprising steps of:
   (a) measuring vehicle acceleration values;
   (b) calculating average acceleration values over varying length windows of time from the measured acceleration values;
   (c) comparing average acceleration values to a first threshold; and
   (d) calculating delta velocity values from the average acceleration values when an average acceleration value exceeds the first threshold;
   (e) whereby a start of a vehicle crash event is detected when a delta velocity value exceeds a velocity threshold.

2. The method claim of 1 further comprising a step of comparing average acceleration values to a second threshold; whereby an end of vehicle crash event is detected when a plurality of consecutive average acceleration values is less than the second threshold.

3. The method of claim 2 wherein the first threshold equals the second threshold.

4. The method of claim 3 wherein the first threshold is about 5 G's and the second threshold is about 3 G's.

5. The method of claim 1 wherein the average acceleration values are calculated from acceleration values measured along two axes.

6. The method of claim 1 wherein the average acceleration values are calculated from acceleration values measured along three axes.

7. The method of claim 1 further comprising a step of further processing acceleration data after detecting the end of a first event to detect an additional event.

8. The method of claim 7 wherein the further processing step comprises steps of:
   (i) measuring further vehicle acceleration values;
   (ii) calculating further average acceleration values over varying length windows of time from the further measured acceleration values;
   (iii) comparing further average acceleration values to the first threshold; and
   (iv) calculating further delta velocity values from the further average acceleration values when a further average acceleration value exceeds the first threshold.

9. The method of claim 1 further comprising a step of detecting a final orientation of a final acceleration vector.

10. The method of claim 9 further comprising a step of generating an event report, wherein the event report comprises a final vehicle orientation.

11. The method of claim 1 further comprising a step of calculating a principal direction of force whereby the velocity threshold is selected based upon the principal direction force.

12. The method of claim 1 further comprising a step of transmitting an event report.

13. The method of claim 12 wherein the event report comprises:
   an event start time;
   an event end time; and
   event acceleration data.

14. The method of claim 1 wherein measuring vehicle acceleration values comprises filtering vehicle acceleration values to compensate for a DC bias.

15. A method for processing acceleration measurements to detect a threshold condition comprising the steps of:
   (a) measuring acceleration values;
   (b) calculating an average acceleration value over a first length window of time of the acceleration values;
   (c) comparing the average acceleration value to a first threshold;
   (d) repeating steps (b) and (c) using a second length window of time; and
   (e) calculating delta velocity values from the average acceleration values when an average acceleration value exceeds the first threshold;
   (f) whereby a start of an event is detected when any of the delta velocity values exceeds a velocity threshold.

16. A method for detecting a crash event comprising the steps of:
   measuring acceleration values at a plurality of points in time;
   calculating average acceleration values from the measured acceleration values over varying length windows of time;
   comparing the average acceleration values to a first threshold; and
   calculating delta velocity values from the average acceleration values if an average acceleration value exceeds the first threshold;
   whereby a start of an event is detected when any of the delta velocity values exceeds a velocity threshold; and
   an end of the event is detected when a plurality of consecutive acceleration data values returns to a value less than a second threshold.

17. An apparatus for detecting a vehicle crash event comprising:
   an accelerometer measuring acceleration and producing acceleration values;
   a processor connected to receive acceleration values, said processor calculating average acceleration values over varying length windows of time from the acceleration values;
   wherein the processor compares the average acceleration values to a first threshold;
   wherein the processor determines delta velocity values from the average acceleration values when an average acceleration value exceeds the first threshold; and wherein the processor detects a start of a vehicle crash event when a delta velocity value exceeds a velocity threshold.

18. An apparatus for detecting a vehicle crash event comprising:

means for measuring acceleration and for producing acceleration values;

a first means for calculating average acceleration values over varying length windows of time from the acceleration values;

a second means for comparing the average acceleration values to a first threshold; and a third means for calculating delta velocity values from the average acceleration values when an average acceleration value exceeds the first threshold;

whereby a start of a vehicle crash event is detected when a delta velocity value exceeds a velocity threshold.

19. A method for detecting a vehicle crash event comprising steps of:

(a) measuring vehicle acceleration values;

(b) calculating average acceleration values from the measured acceleration values;

(c) comparing average acceleration values to a first threshold;

(d) calculating a principal direction of force when an average acceleration value exceeds the first threshold;

(e) selecting a velocity threshold based upon the principal direction of force; and (f) calculating delta velocity values from the average acceleration values;

(g) whereby a start of a vehicle crash event is detected when a delta velocity value exceeds the velocity threshold.

20. The method of claim 19 wherein the average acceleration values are calculated from acceleration values measured along two axes.

21. The method of claim 19 wherein the average acceleration values are calculated from acceleration values measured along three axes.

* * * * *